United States Patent [19]

Hunter

[11] 3,873,592

[45] Mar. 25, 1975

[54] OXYALYL CARBAZATES, AND OLIGOMERS THEREOF

[75] Inventor: Byron A. Hunter, Woodbridge, Conn.

[73] Assignee: Uniroyal, Inc., New York, N.Y.

[22] Filed: Sept. 12, 1973

[21] Appl. No.: 396,633

Related U.S. Application Data

[62] Division of Ser. No. 354,586, April 26, 1973, Pat. No. 3,819,545.

[52] U.S. Cl. ............................ 260/463, 260/482 B
[51] Int. Cl. ......................................... C07c 109/08
[58] Field of Search ....................... 260/482 B, 463

[56] References Cited
OTHER PUBLICATIONS

Majumdar et al., Chemical Abstracts, Vol. 28 33826 (1934).

*Primary Examiner*—Alton D. Rollins
*Assistant Examiner*—Diana G. Rivers
*Attorney, Agent, or Firm*—Robert J. Patterson, Esq.

[57] ABSTRACT

Certain oxalyl carbazates are useful as blowing agents for polymers. Some of these carbazates are new compounds.

4 Claims, No Drawings

OXALYL CARBAZATES, AND OLIGOMERS THEREOF

This is a division of application Ser. No. 354,586, filed Apr. 26, 1973, which matured on June 25, 1974 as U.S. Pat. No. 3,819,545.

This invention relates to the production of gas-expanded polymers with a new class of chemical blowing agents, namely oxalyl carbazates. Some of these carbazates are new compounds.

Blowing agents which decompose at relatively high temperatures are not new. U.S. Pat. No. 3,235,519 discloses using sulfonyl semicarbazides as blowing agents for polymeric materials which soften above 170°C. These blowing agents are particularly suitable for expanding high density polyethylenes, and many other rubbery and plastic polymers, but they are unsuitable for expanding certain polymers because they produce ammonia gas upon decomposition. Ammonia gas tends to attack certain polymeric materials such as polycarbonates and polyesters, and, in some instances, reacts with the metals used for the construction of molding equipment.

This invention provides a new class of blowing agents which begin to decompose non-explosively, and controllably, at temperatures not lower than 200°C, and preferably not lower than 225°C, but have high heat stability at temperatures below 200°C. Thus, they are useful for expanding polymeric materials that soften at, or below, these high temperatures.

The term "polymeric material" means homopolymers, interpolymers, graft polymers, and mixtures and blends of two or more of these, and includes thermoplastic, thermosetting and rubbery polymers. In particular, the new blowing agents are useful for expanding polymers that have high processing temperatures such as the polycarbonates, phenylene oxide-based resins, polyaryl sulfones, the various nylons, polyesters, certain polystyrenes, polypropylene, poly(styreneacrylonitrile), polyacetals, urethane elastomers, polyvinyl polymers, polyphenylene sulfide, polymethyl pentene, certain polyethylenes, polyimides, polyaryl ethers, ABS polymers, polyacrylics, cellulosic polymers, halogenated polymers, especially the fluoroplastics, poly(ethylene vinyl acetate), and polymer alloys.

Broadly, the new class of blowing agents includes certain oxalyl carbazates, and oligomeric condensation products of oxalic hydrazide and one or more polyhaloformates. Upon decomposition, these substances produce no ammonia. Rather, they produce primarily olefins, carbon dioxide, carbon monooxide, and alcohols, and smaller amounts of nitrogen.

Generally, the amount of blowing agent used will depend on the nature of the polymer to be expanded, and the desired density of the foam to be produced. Usually, 0.05 to 15, and, most often, 0.1 to 5.0 parts blowing agent are employed, based on 100 parts of polymer by weight. The blowing agents can be used alone, or in combination with other blowing agents. Activating substances can be used to increase the gas-releasing efficiency, or to lower the normal decomposition temperature, of the blowing agents of the invention. Other additives such as plasticizers, fillers, nucleating agents, and the like, can also be added to the polymer to be expanded.

More particularly, the oxalyl carbazates of the invention have the general formula:

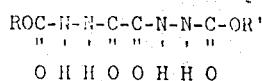

where R and R' are the same or different, but preferably the same, and are hydrocarbyl groups such as branched-chain and straight-chain alkyl radicals having 1 to 8 carbon atoms; cycloalkyl radicals containing 5 to 8 carbon atoms, especially cyclohexyl; and aryl, aralkyl, and alkaryl radicals containing 6 to 10 carbon atoms, such as phenyl, benzyl, the tolyls and the xylyls.

Examples of these compounds are: oxaylylbis(methylcarbazate), oxalylbis(ethyl carbazate), oxalylbis(n-propyl carbazate), oxalylbis(isopropyl carbazate), oxalylbis(n-butyl carbazate), oxalylbis(sec-butyl carbazate), oxalylbis(tert-butyl carbazate, oxalylbis(isobutyl carbazate), oxalylbis(n-amyl carbazate), oxalylbis(sec-amyl carbazate, oxalylbis(2-methylbutyl carbazate), oxalylbis(3-methylbutyl carbazate), oxalylbis(n-hexyl carbazate), oxalylbis(2,3-dimethylbutyl carbazate), oxalylbis(heptyl carbazate), oxalylbis(octyl carbazate), oxalylbis(isooctyl carbazate), oxalylbis (2-ethylhexyl carbazate), oxalylbis(cyclohexyl carbazate), oxalylbis(cyclooctyl carbazate), oxalylbis(phenyl carbazate), oxalylbis (benzyl carbazate), oxalylbis(tolyl carbazate), oxalylbis(xylyl carbazate), oxalylbis(naphthyl carbazate), carbomethoxy carboethoxy oxalyldihydrazide, 1-carbomethoxy-6-carboisopropoxy oxalyldihydrazide, isopropoxy carbophenoxy oxalyldihydrazide, and carbomethoxy carbocyclohexoxy oxalyldihydrazide.

These compounds can be made by reacting oxalyldihydrazide with a haloformate ester in the presence of an acid acceptor such as ammonium hydroxide, sodium carbonate, or sodium bicarbonate. This reaction is usually effected in the liquid phase at temperatures from 0° to 100°C, at ambient pressure, and at a mole ratio of haloester to dihydrazide of from 3:1 to 2:1, preferably from 2.2:1 to 2:1. A common solvent for the reactants is ordinarily used, and water or alcohols such as methanol, ethanol, isopropanol, or mixtures of water and alcohols may be used.

Another known method of forming these carbazates comprises reacting a hydrocarbyl oxalate, or an oxalyl chloride, with one or more alkyl carbazates in the solvents described above.

The oligomeric condensation products of the invention are made by condensing oxalic dihydrazide with one or more polyhaloformates, preferably polychloroformate. Typically, these oligomers have a melting point of 50° to 100°C, and are made by reacting the polyhaloformate, such as diethylene glycolbis (chloroformate) or ethylene glycol bis (chloroformate) with oxalyldihydrazide at a temperature in the range from 20° to 100°C, at ambient pressure, and at a mole ratio of dihydrazide to polyhaloformate of 1.1:1 to 1:1.1. Usually, the reaction is effected in a solvent such as water or an alcohol, and in the presence of an acid acceptor such as those mentioned above.

These oligomers of this invention have the general formula:

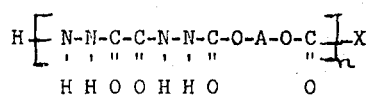

where $n$ is a number from 1 to 100, preferably 2 to 50, X is chlorine, bromine or iodine, and A is a divalent radical selected from the group consisting of alkylene radicals having 2 to 6 carbon atoms, arylene radicals having 6 to 10 carbon atoms, oxydialkylene radicals having 4 to 12 carbon atoms, and oxydiarylene radicals containing 12 to 20 carbon atoms. Examples of these radicals are: methylene, ethylene, propylene, isopropylene, butylene, isobutylene, isobutylidene, pentamethylene, hexamethylene, phenylene, tolylene, naphthylene, oxydiethylene, oxydipropylene, oxydibutylene, oxydipentamethylene, oxydihexamethylene, oxydiphenylene, oxyditolylene and oxydinaphthylene. If cyclization of these oligomers occurs, the terminal hydrogen and halogen radicals will not be present.

These oligomeric condensation products, and oxalylbis (methyl carbazate), are new compounds. The oligomers are especially useful as blowing agents because they are particularly compatible with the polymers to be expanded. Upon decomposition oxalyl bis(methyl carbazate) produces an unexpectedly large quantity of non-condensible gas (64 mole percent), and is thus a more desirable blowing agent than the known compound oxalylbis (ethyl carbazate), which produces only 22 mole percent of non-condensible gas, both measured at room temperature.

The following examples illustrate the preparation of some of the oxalyl carbazates and oligomers of the invention, their efficiency as gas-producing agents upon decomposition, and their use as blowing agents for producing expanded polymeric materials.

EXAMPLE I

Preparation of Oxalyl Bis(Methyl Carbazate)

A one-liter reaction flask was charged with 59.0 grams (0.5 mole) of oxalyldihydrazide and 300 millimeters(ml) of water. Then 105 grams (1.1 moles) of methyl chloroformate was gradually added over a period of ½ hour while the temperature was held under 40°C. The mixture was stirred for 15 minutes, and then 60.4 grams(g) of concentrated ammonium hydroxide were added over a time period of ½ hour, keeping the temperature under 40°C. The mixture was stirred 1 hour while the temperature was maintained between 30° and 35°C, and then an additional 18.0 g of concentrated ammonium hydroxide were added. The reaction mixture was diluted with 300 ml of water, a white precipitate formed, was filtered, washed with cold water, and dried at 65°C. The yield was 96 g, or 82.4 percent of the theoretical yield. The melting point of the precipitated compound was 227°–230°C. Analysis of this compound showed it contained 23.94 percent nitrogen; the calculated value is 23.93 percent.

The ammoniacal filtrate of the white precipitate described above was acidified to a pH of 3.0 with dilute sulfuric acid. The resulting crystalline precipitate was filtered, washed and dried, yielding 6.0 g of a material having a melting point of 215°–220°C. This compound began to decompose, and to produce blowing gas, at 221°C.

EXAMPLE II

Preparation of Oxalyl Bis(Ethyl Carbazate)

A one-liter reaction flask was charged with 59 g (0.5 mole) of oxalyl dihydrazide and 500 ml water. The mixture was stirred as 108 g (1.0 mole) of ethyl chloroformate were added dropwise over a period of 1 hour. The temperature was maintained below 40°C. After one-half of the chloroformate had been added, 60.4 g (1 mole) of concentrated ammonium hydroxide was added simultaneously with the balance of the chloroformate. After these additions, the reaction mixture was stirred for one hour. A white crystalline product formed, was filtered, washed with water, and dried at 60°C. The yield was 113 g (86.2 percent of theory). The product melted at 186°–189°C, and began to decompose at 212°C. Analysis showed a 21.67 percent nitrogen content; the calculated value is 21.65 percent.

EXAMPLE III

Preparation of Oxalyl Bis(Isopropyl Carbazate)

A 2-liter reaction flask was charged with 527 g (2.0 moles) of 19 percent hydrazine hydrate. Then 146 g (1.0 mole) of diethyloxalate were added over a period of one hour while the reaction temperature was maintained below 35°C. After the addition of oxalate was completed, the reaction mixture was stirred for 1½ hours. Then 500 ml water were added, and 245 g (2.0 moles) of isopropylchloroformate was added dropwise while the reaction temperature was maintained below 45°C. After one-half of the chloroformate had been added, 121 g (2 moles) of concentrated ammonium hydroxide was added simultaneously with the balance of the chloroformate. Stirring was continued for ½ hour, a white crystalline product formed, was filtered, washed with water, and dried. The product weighed 192 g (66 percent of theory). A portion of the product was recrystallized from ethanol; this portion melted at 188°–192°C, and began to decompose at 212°C. Analysis of this portion showed: Percent nitrogen, calculated 19.31, found 19.32; percent carbon, calculated 41.38, found 41.08; percent hydrogen, calculated 6.21, found, 6.18.

EXAMPLE IV

Preparation of Oxalyl Bis(Isobutyl Carbazate)

A 3-liter flask was charged with 118 g (1.0 mole) of oxalyl dihydrazide, 106 g (1.0 mole) of sodium carbonate, and 1 liter of ethanol. Then 3.5 g (2.2 moles) of isobutyl chloroformate were added over a period of 2 hours while the mixture was stirred continuously. The temperature of the mixture increased slowly to 43°C. After standing overnight, the mixture was heated to reflux for ½ hour, cooled slightly to 70°C, and filtered from a mixture of sodium chloride, and a small quantity of oxalyl dihydrazide. The filtrate was added to a large volume of water whereupon a white crystalline product separated, which was filtered, washed well with water and dried at 65°C. The yield was 117 g; the product melted in the range of 141°–155°C. This product was washed with hot benzene to produce a residual solid weighing 97 grams, and melting at 152°–155°C. This residual solid began to decompose, and produce blowing gas, at 230°C. Analysis of this compound showed: Percent nitrogen: calculated, 17.61, found, 17.33; percent carbon: calculated, 45.28, found, 45.05; percent hydrogen: calculated, 6.92, found, 6.98.

EXAMPLE V

Preparation of Oxalyl Bis(2-Ethyl Hexyl Carbazate)

A 2-liter reaction flask was charged with 59 g (0.5 mole) of oxalyl dihydrazide, 53 g (0.5 mole) of sodium carbonate, and 500 ml of ethanol. Then 211.8 g (1.1 mole) of 2-ethylhexyl chloroformate were added dropwise over a period of 1.5 hours as the reaction temperature rose slowly to 40°C. After the addition of chloroformate was completed, the mixture was heated to reflux for 15 minutes, then cooled to 70°C, and filtered from a mixture of chloride and a small quantity of oxalyl dihydrazide. The filtrate was poured into a large volume of water whereupon a semi-crystalline product separated. This product was filtered, washed with water, and dried at 65°C. The product weighed 105 grams, and melted at 99°–105°C. This product was recrystallized from a 70/30 blend by volume of hexane and benzene to produce 89 g of crystals which melted at 115°–118°C, and began to decompose at 239°C. Analysis of this product showed: Percent carbon: calculated, 55.81, found, 55.85; percent hydrogen: calculated, 8.84, found, 9.09; percent nitrogen: calculated, 13.05, found, 12.83.

EXAMPLE VI

Preparation of Oxalyl Bis(Benzyl Carbazate)

A 2-liter reaction flask was charged with 59 g (0.5 mole) of oxalyl dihydrazide, 59 g (0.5 mole) of sodium carbonate and 500 ml of ethanol. Then 187.6 g (1.1 mole) of benzyl chloroformate were added over a period of 1 hour as the reaction temperature rose to 65°C. After standing overnight, the reaction mixture was heated to reflux for 1 hour. The mixture was cooled to 30°C, and a white product was recovered, washed with hot water, and dried. The yield was 109 g; the product melted at 217°–220°C, and decomposed when heated above 220°C. Analysis of this product showed: percent nitrogen calculated, 14.51 percent, found, 14.31 percent.

EXAMPLE VII

Oxalyl Bis(n-Butyl Carbazate)

A 2-liter flask was charged with 279 g (1.5 mole) of 26.8 percent hydrazine hydrate and 100 ml water. Then 109.5 g (0.75 mole) of diethyl oxalate was added over a period of three-fourths of an hour while the temperature was maintained below 35°C. The mixture was stirred an additional ½ hour, and then 205 g (1.5 mole) of n-butyl chloroformate was added over a period of 1 hour while the temperature was maintained below 40°C. Next, 90.6 g (1.5 moles) of concentrated ammonium hydroxide were added over a period of 1 hour while the temperature was maintained below 40°C. After stirring an additional three-fourths of an hour, the product was filtered, washed with water, and dried. The product weighed 175 g (73 percent of theoretical), and melted at 163°–160°C.

The product was dissolved in ethanol, and filtered from a small amount of insoluble matter. Water was added to the filtrate, and the white crystalline precipitate was filtered, washed with water and dried. The yield was 152 grams; the product melted at 166°–168°C, and began to decompose at 249°C. Analysis of this product showed: Percent nitrogen calculated, 17.61 percent, found, 17.75 percent.

EXAMPLE VIII

Oxalyl bis(n-Propyl Carbazate)

A 2-liter flask was charged with 279 g (1.5 moles) of 26.9 percent hydrazine hydrate and 100 ml water. Then 109.5 g of diethyl oxalate were added over a period of three-fourths of an hour while the temperature was maintained below 35°C. The mixture was stirred an additional ½ hour, and then 183.8 g (1.5 moles) of n-propyl chloroformate was added over a period of three-fourths of an hour while the temperature was maintained below 30°C. The mixture was stirred an additional 15 minutes, and then 90.6 g (1.5 moles) of concentrated ammonium hydroxide were added over a period of three-fourths of an hour. The mixture was stirred another ½ hour, and cooled to 20°C; a product formed, was filtered, washed with water, and dried. The product weighed 173 g (79 percent of theory). This product was dissolved in ethanol, and filtered from a small quantity of insoluble matter. Water was added to the filtrate, a white crystalline solid formed and was filtered, washed with water and dried. The product weighed 142 g, melted at 154°–156°C, and began to decompose at 207°C. Analysis of this product showed: Percent nitrogen calculated, 19.31 percent, found, 19.38 percent.

EXAMPLE IX

Preparation of Oxalyl Bis(Phenyl Carbazate Dihydrate)

A 2-liter flask was charged with 59 g (0.5 mole) oxalyl dihydrazide and 500 ml water. Then 172.3 g (1.1 mole) of phenyl chloroformate were added dropwise over a period of 1 hour while the reaction temperature rose spontaneously to 50°C. After one-half of the chloroformate had been added, 250 ml of water was added together with 66.5 ml of concentrated ammonium hydroxide (1.0 mole) and the balance of the chloroformate. Another 250 ml of water was added thereafter to dilute the thickened mixture. The mixture was stirred for an additional hour, and a white crystalline product formed, was filtered, and washed with water. The wet filter cake produced was immersed in fresh water, heated to boiling, and filtered, and the insoluble precipitate formed was dried at 65°C. The yield was 173 g (96.6 percent of theory); the product melted at 224°–227°C, and began to decompose at 217°C. Analysis (Calculated for dihydrate) of this product showed: Percent carbon: calculated, 48.6, found 48.74 and 48.25; percent hydrogen: calculated, 4.56, found 4.39 and 4.63; percent nitrogen: calculated, 14.2, found 14.2 and 14.28.

EXAMPLE X

Condensation Product of Diethylene Glycol Bis(Chloroformate) with Oxalyl Dihydrazide A 2-liter reaction flask was charged with 29.5 g (0.25 mole) of oxalyl dihydrazide, 26.5 g of sodium carbonate and 500 ml of water. The mixture was stirred while 58 g (0.25 mole) diethylene glycol bis(chloroformate) were added over a period of one-half hour. The reaction temperature rose to 35°C. After stirring for 1½ hours at 35°C, the mixture was cooled, and the white crystalline product obtained was filtered, and washed with water. The dried oligomeric product weighed 64 g, melted at 62°C, and began to decompose at about 280°C. This product yielded 124 cubic centimeters (cc) of gas per g weight upon decomposition.

EXAMPLE XI

Condensation Product of Oxalic Dihydrazide and Monoethylene Glycol bis(Chloroformate)

A 2-liter reaction flask was charged with 53 g (0.5 mole) of sodium carbonate, 59 g (0.5 mole) oxalic dihydrazide, and 750 ml water. The mixture was stirred as 93.5 g (0.5 mole) monoethylene glycol bis(chloroformate) was added dropwise over one hour, holding the reaction temperature under 30°C. After completing this addition, the mixture was stirred for 20 hours at room temperature. A solid white product formed, was filtered, washed with water, and dried. The product weighed 99 g (an 85.3 percent yield), melted at 83°C, and began to decompose at 229°C.

EXAMPLE XII

Preparation of Oxalyl bis(Cyclohexyl Carbazate)

A 2-liter reaction flask was charged with 53 g (0.5 mole) of sodium carbonate, 59 g (0.5 mole) oxalic dihydrazide, and 75 ml water. While the mixture was stirred, 165.5 g (1.0 mole) of cyclohexyl chloroformate was added dropwise over a period of 1 hour, and the temperature was held under 40°C. Thereafter, the mixture was stirred for 2 hours at 40°C. A white solid formed, was filtered, washed well with water, and dried at 60°C, yielding 146 g (78 percent of theory). The product melted at 193°–205°C, and decomposed in the range 225°–255°C. Recrystallized from methanol, the product melted at 212°–215°C, and decomposed in the range 235°–265°C. Analysis of this product showed: percent carbon calculated, 51.89 percent, found 51.51; percent hydrogen calculated, 7.03 percent, found 7.24 percent; percent nitrogen calculated, 15.14 percent, found 15.14 percent.

EXAMPLE XIII

Gas Evolution Data

In this example, several of the blowing agents of the invention were decomposed in a device consisting of a 100-cc graduated burette attached, through capillary tubing, to a decomposition tube immersed in a stirred, silicone fluid bath. Mercury was charged to the burette and leveling bulb to confine the evolved gas.

From 0.2 to 0.3 g of each blowing agent was charged to the decomposition tube. Six cc paraffin oil was added, and the tube was attached to the capillary leading to the burette. The tube was immersed in the bath, which had been heated to a temperature about 50°C below the expected decomposition temperature. Heating and stirring continued steadily until gas evolved from the compound; the decomposition temperature was noted. The system was adjusted to room temperature; the pressure, to atmospheric; and the gas volume was corrected to standard conditions, and calculated. The results are in table I below.

TABLE I

|  | Gas Evolution, cc/g |
|---|---|
| Oxalyl bis(methyl carbazate) | 196 |
| Oxalyl bis(ethyl carbazate) | 173 |
| Oxalyl bis(n-propyl carbazate) | 145 |
| Oxalyl bis-(isopropyl carbazate) | 147.5 |
| Oxalyl bis(n-butyl carbazate) | 135 |
| Oxalyl bis(isobutyl carbazate) | 137 |
| Oxalyl bis(2-ethyl hexyl carbazate) | 87.5 |
| Oxalyl bis(benzyl carbazate) | 120 |
| Oxalyl bis(cyclohexyl carbazate) | 119 |
| Oxalyl bis(phenyl carbazate) | 123 |
| Product of Example X | 124 |

EXAMPLE XIV

Expansion of Polyphenylene Oxide with Oxalyl bis(Methyl Carbazate)

Polyphenylene oxide pellets, sold under the tradename Noryl SE-100 and made by General Electric, were mixed with 0.5 percent oxalyl bis(methyl carbazate) by weight until the pellets were thoroughly coated with the carbazate, fed into an extruder (Laboratory Plastic Extruder, Table Model, made by Wayne Machine & Die Co., and having a 0.75 inch diameter, and a length/diameter ratio of 20:1), and were extruded at 271°C. The extruded, expanded plastic had a density of 0.49 grams/cubic centimeter (g/cc); unexpanded extrudate from similar pellets had a density of 1.09 g/cc.

EXAMPLE XV

Expansion of Polycarbonate with Oxalyl bis(Methyl Carbazate)

Polycarbonate pellets, coded Lexan 101 and made by General Electric, were mixed with 1 percent oxalyl bis(methyl carbazate) by weight of the polycarbonate, and extruded from the extruder described in example XIV at a stock temperature of 285°C. The density of the expanded extrudate was 0.58 g/cc; unexpanded polycarbonate had a density of 1.18 g/cc.

EXAMPLE XVI

Expansion of Polysulfone with Oxalyl bis(Methyl Carbazate)

Polysulfone pellets, sold under the tradename P-1700 by Union Carbide Co., were dried, tumble-mixed with oxalylbis(methyl carbazate) at a rate of 1.5 g carbazate to 100 g pellets. The coated pellets were fed to a standard 5-ounce reciprocating screw injection molding machine under the following conditions: rear temperature, 290°C; center, 321°C; front, 327°C; mold, 70°C. Injection pressure was 4800 psi. A foamed bar, measuring 5 by 0.5 by 0.25 inches, was formed, and weighed 7.4g. An unexpanded bar of the same dimensions weighed 12.7 g.

EXAMPLE XVII

Expansion of ABS with Oxalylbis(Methyl Carbazate)

Oxalylbis (methyl carbazate), 1.5 percent by weight, and mineral oil, 0.5 percent by weight, were dry-tumbled with dried acrylonitrile-butadiene-styrene (Kralastic K-3282: high acrylonitrile, medium impact, easy flowing resin), and processed by injection molding in a 200-ton Lombard structural foam molding machine, described in U.S. Pat. Nos. 3,596,318 and 3,674,401. In this so-called high pressure process, the mold is filled with solid material, and plates are moved to allow expansion of the resin. The temperature profile was: nozzle temperature, 265°C; front zone 271°C; center zone, 254°C; rear zone-2, 210°C; rear zone- 1, 200°C; stock temperature, 260°–265°C; and mold temperature, 10°–25°C; Screw speed was 30 rpm. Expansion in the mold was over a 15-second period, and total cycle time was 2 minutes. The plates in the mold were moved to enlarge the cavity by 300 mils. The ABS expanded, completely filling the cavity and producing excellent surface details. The resulting reduction in specific gravity was 50 percent, and the expanded ABS had fine cell structure.

EXAMPLE XVIII

Expansion of Polycarbonate with Oxalyl bis(Isopropyl Carbazate)

Oxalylbis (isopropyl carbazate) was dry-tumbled with dried polycarbonate pellets (Lexan 101) in the amount of 2.5 parts carbazate per 100 parts of pellets. The coated pellets were injection molded on a 3-ounce Van Dorn reciprocating screw, injection molding machine, into a foamed plaque measuring 4 5/8 by 2 5/8 by 1/4 inches whose specific gravity was 0.8 g/cc; a plaque of the same dimensions made from unfoamed polycarbonate had a specific gravity of 1.2 g/cc.

EXAMPLE XIX

Expansion of Polysulfone with Oxalyl Carbazates

Polysulfone pellets, coded P-1700, were coated with several different oxalyl carbazates of the invention, and the coated pellets were extruded from the extruder described in example XIV at the temperatures set forth in Table II below.

TABLE II

| Blowing Agent | Amount, pbw PS* | Stock Temp, °C | Specific Gravity |
|---|---|---|---|
| Oxalyl bis(methyl carbazate) | 0.25 | 307 | 0.62 |
| Oxalyl bis(ethyl carbazate) | 0.25 | 313 | 0.79 |
| Oxalyl bis(n-propyl carbazate) | 0.25 | 315 | 0.85 |
| Oxalyl bis(n-butyl carbazate) | 0.25 | 310 | 0.94 |
| None | — |  | 1.24 |

*pbw PS: parts by weight of polysulfone. Similar good results were obtained using 0.70 pbw oxalylbis (2-ethylhexyl carbazate), 0.60 pbw oxalylbis (isobutyl carbazate), 0.75 pbw oxalylbis (benzyl carbazate), and 0.75 pbw oxalylbis (phenyl carbazate dihydrate).

EXAMPLE XX (COMPARATIVE)

Expansion of Polycarbonate with P-Toluene Sulfonyl Semicarbazide and with Oxalylbis(Methyl Carbazate)

Two portions of dried polycarbonate pellets (Lexan 101) were coated with blowing agents, the first with 1 percent oxalylbis(methyl carbazate) by weight of the polycarbonate, and the second with 1 percent by weight of p-toluene sulfonyl semicarbazide. Each portion of coated pellets was extruded from the extruder described in example XIV; the extruder had three temperature zones of 282°, 293°, and 282°C, respectively, and the stock temperature was 279°C at the diehead.

At these high processing temperatures, the semicarbazide-blown plastic was strongly discolored; the carbazate-blown plastic retained its original color.

Moreover, as determined by relative viscosity measurements, the carbazate-blown pellets suffered far less degradation than the semi-carbazide-blown pellets. In this test, each of the foregoing extrudates, and a third, unfoamed polycarbonate extrudate, were chopped into small pieces, and 0.5 g of each were dissolved in methylene chloride. Using a Cannon Ubbelohde viscometer, the efflux time for the solvent alone, and for each dissolved extrudate, was measured, and the relative viscosity was calculated by dividing the efflux time for each solution by the efflux time for the pure solvent. Unfoamed polycarbonate had a relative viscosity of 1.311; carbazate-blown polycarbonate, 1.265; and semi-carbazide blown polycarbonate, 1.185. These data are directly proportional to intrinsic viscosity, which is, in turn, directly proportional to molecular weight. A decrease in molecular weight implies a directly proportional decrease in physical properties, and the data obtained establish that the blowing agents of the invention produce a much smaller loss of these properties than the known semicarbazide.

What is claimed is:

1. Oxalylbis(methyl carbazate).

2. An oligomer of the formula

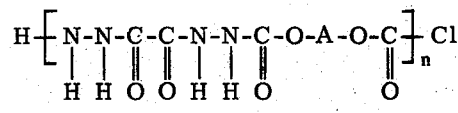

wherein $n$ is an integer from 1 to 100 and A is a divalent radical selected from the group consisting of methylene, ethylene, propylene, isopropylene, butylene, isobutylene, isobutylidene, pentamethylene, hexamethylene, phenylene, tolylene, naphthylene, oxydiethylene, oxydipropylene, oxydibutylene, oxydipentamethylene, oxydihexamethylene, oxydiphenylene, oxyditolylene, and oxydinaphthylene.

3. An oligomer according to claim 2 where $n$ is 2 to 50.

4. An oligomer according to claim 3 where A is —CH$_2$CH$_2$— or —CH$_2$CH$_2$OCH$_2$CH$_2$—.

* * * * *